US008599831B2

(12) United States Patent
Shen et al.

(10) Patent No.: US 8,599,831 B2
(45) Date of Patent: Dec. 3, 2013

(54) METHOD FOR ESTABLISHING A SESSION BETWEEN A CALLER AND A CALLEE

(75) Inventors: Qingchun Shen, Guangdong Province (CN); Lei Yuan, Guangdong Province (CN); Caixia Miao, Guangdong Province (CN); Wenge Zhang, Guangdong Province (CN); Wanjun Shang, Guangdong (CN); Xiaodong Chen, Guangdong Province (CN); Xiangyu Yang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2014 days.

(21) Appl. No.: 11/479,133

(22) Filed: Jun. 30, 2006

(65) Prior Publication Data
US 2007/0071216 A1    Mar. 29, 2007

(30) Foreign Application Priority Data
Jul. 1, 2005 (CN) .......................... 2005 1 0080333

(51) Int. Cl.
*H04L 12/66* (2006.01)
*H04M 3/42* (2006.01)

(52) U.S. Cl.
USPC .................. 370/352; 379/211.02; 379/211.03

(58) Field of Classification Search
USPC .................. 370/352; 379/211.02–211.04
See application file for complete search history.

(56) References Cited

U.S. PATENT DOCUMENTS

| | | | |
|---|---|---|---|
| 7,489,771 B2 * | 2/2009 | McMurry et al. | 379/201.01 |
| 2002/0142749 A1 | 10/2002 | Muniere et al. | |
| 2003/0190032 A1 | 10/2003 | Ravishankar | |
| 2005/0157660 A1 * | 7/2005 | Mandato et al. | 370/254 |
| 2006/0007864 A1 | 1/2006 | Li et al. | |
| 2006/0193451 A1 * | 8/2006 | Sharma | 379/88.16 |
| 2006/0227728 A1 * | 10/2006 | Baumann | 370/260 |
| 2007/0071216 A1 | 3/2007 | Shen et al. | |

FOREIGN PATENT DOCUMENTS

| | | |
|---|---|---|
| CN | 1489354 A | 4/2000 |
| CN | 1852358 A | 10/2006 |
| WO | WO 03032585 A1 | 4/2003 |
| WO | WO 2005020535 A1 * | 3/2005 |

OTHER PUBLICATIONS

Kutscher et al., Session Description and Capability Negotiation, Oct. 27, 2003, IETF, draft-ietf-mmusic-sdpng-07.txt.*

(Continued)

*Primary Examiner* — Nicholas Jensen

(57) ABSTRACT

The invention discloses a method for establishing a session between a caller and a callee, applying to a next generation network, after said callee picking up, which includes: restarting a session negotiation with said callee via a first application server corresponding to the callee, upon obtaining a session description protocol of said callee, sending an update request message containing a session description protocol of said callee to a second application server corresponding to the caller; renegotiating, by the second application server, session with a caller according to said session description protocol of said callee; after the caller completing session update, returning a response message containing a session description protocol of said caller to said callee. The method can realize the multi-service nesting triggering or the forwarding triggering of several flows in one service, and can guarantee the proper connection between the caller and the callee.

1 Claim, 4 Drawing Sheets

(56) References Cited

OTHER PUBLICATIONS

ETSI, Digital cellular telecommunications system (Phase 2+); Universal Mobile Telecommunications System (UMTS); Signalling flows for the IP multimedia call control based on Session Initiation Protocol (SIP) and Session Description Protocol (SDP); Jun. 2005, 3GPP TS 24.228 version 5.13.0 Release 5, ETSI TS 124 228 v5.13.0.*
International Search Report for PCT/CN2006/001298.
Written Opinion of the International Searching Authority dated Sep. 14, 2006 in connection with International Patent Application No. PCT/CN2006/001298.
M. Handley, et al., "SDP: Session Description Protocol", Apr. 1998, 38 pages.
J. Rosenberg, et al. "SIP: Session Initiation Protocol", Jun. 2002, 202 pages.
Partial Translation of Office Action dated Sep. 18, 2009 in connection with Chinese Patent Application No. 200680013327.6.
Partial Translation of Office Action dated Apr. 26, 2010 in connection with Chinese Patent Application No. 200680013327.6.

* cited by examiner

METHOD FOR ESTABLISHING A SESSION BETWEEN A CALLER AND A CALLEE

CROSS-REFERENCE TO RELATED APPLICATIONS/INCORPORATION BY REFERENCE

This patent application makes reference to, claims priority to and claims benefit from Chinese Patent Application No. 200510080333.0 filed on Jul. 1, 2005.

FIELD OF THE INVENTION

The present invention relates to the communication technology field, more specifically to a method for establishing a session between a caller and a callee.

BACKGROUND OF THE INVENTION

The next generation network (NGN) is developing rapidly and introducing in a lot of new services. In the field of voice and multimedia services, it has become a trend to control and realize NGN services based on the flexible and extendable SIP (Session Initial Protocol) signaling and other auxiliary signalings such as RTP (Real Time Transport Protocol) and SDP (Session Description Protocol) etc.

Currently many services are co-existing and in order to satisfy the increasing requirements of the users and to take into account the repeatability of service characteristics, it is necessary to combine the current services and to realize the nesting of different service characteristics, which results in the problem of nesting between multi-services accordingly.

However, the current NGN services only take into account the processing of the un-nesting call flows but can not process the multi-service nesting call flows properly. At the same time, for example when the hook, the forwarding or the port number changes, it is impossible to process when the SDP of the callee changes. Taking the typical multi-services nesting and forwarding as an example, when the user dials an intelligent service and triggers the corresponding intelligent flow it is necessary to forward the call once and trigger the application server twice and the detailed flow is illustrated in FIG. 1 as follows:

The caller dials the access code of the first service and sends the Invite Message containing its own SDP to the application server AS1 of the caller, which is trigged to perform the first service flow.

The application server AS1 of the caller issues the routing number of the second service (i.e. the access code of the second service) to the soft switch according to the Invite Message. And according to the routing number, the soft switch triggers the application server AS2 of the second service to perform the flow of the second service. Then the application server AS2 calls the designated callee.

After the callee is picked up, the application server AS2 sends the Update Message containing a SDP of the callee to the caller.

The SDP message of the callee is updated at the caller side and the 200 OK Message containing a SDP of the caller is sent to the soft switch.

The callee transfers the Picked-up Response Message and reports it to the application server AS1 of the caller level by level, and the application server AS2 of the caller returns the ACK Message of the callee. And thus the session negotiation process since the number of the callee is issued is finished.

During the above session negotiation process, after being picked up, the callee sends immediately the Update Message containing its own SDP, and at this time the SDP of the callee in the Update Message is the current SDP of the callee. The SDP may change according to the variation of port number of the callee, hence, the caller is required to send the re-Invite Message to the callee after receiving the Update Message from the callee for renegotiation so as to obtain the latest SDP of the callee. The callee returns the 200 OK Message containing its own latest SDP to the caller and the renegotiation process of the callee since being picked up is completed. And the call is established between the caller and the callee.

In addition, during the above session negotiation process, if the picked-up callee (the original callee) is forwarded or hooked to the third callee, the real callee is the third callee whose SDP is different from that of the original one. The Update Message sent by the picked-up original callee includes its own SDP but not the SDP of the real callee (the third callee). Therefore, after receiving the Update Message from the original callee, the caller is required to send the re-Invite Message to the real callee for renegotiation so as to obtain the SDP of the real callee. The real callee returns the 200 OK Message containing its own SDP to the caller and thus the renegotiation process of the callee since being picked up is completed. The call is established between the caller and the real callee accordingly.

The above flows show after the SDP of the callee is updated at the caller side, when the renegotiation between the caller and the callee is performed by employing re-Invite signaling time after time, it will relate to many devices and it is hard to be realized. In addition, in the mode based on B2B (the back to back mode in SIP protocol), the cross processing on the re-Invite signalings will definitely bring chaos. According to the above flows, if the forwarding or service flow nesting occurs for many times, the number of re-Invite signalings will be larger and it will be more likely to lead to chaos, which may cause the single pass status. Moreover, many re-Invite signalings will increase the load of network signalings and result in a higher probability of losing packets and transmission mistake, which will influence the service performance and may even bring the network blast.

SUMMARY OF THE INVENTION

A method for establishing a session between a caller and a second callee, applying to a next generation network, after a first callee picking up and forwarding or hooking to said second callee, further including:

restarting a session negotiation with said second callee via a first application server corresponding to said first callee, upon obtaining a session description protocol of said second callee, sending an update request message with said session description protocol of said second callee to a second application server corresponding to said caller via all levels of soft switches;

renegotiating, by the second application server, a session with said caller according to said session description protocol of said second callee;

after the caller completing session update, returning a response message containing a session description protocol of said caller to said second callee, thus a bidirectional session negotiation is completed between said caller and second callee.

In the above method, when performing the session renegotiation with said second callee, the application server of said first callee sends a re-request message without a session description protocol to said second callee.

Further, after the application server of said first callee performs the session renegotiation with said second callee, said second callee returns its own session description protocol to its application server by the response message.

In the above method, after the session update, said caller returning a response message containing a session description protocol of said caller to said second callee specifically including the steps of:

said caller returning a response message containing its own SDP to the application server of said caller;

the application server of said caller returning a response message to the soft switch of said caller;

the soft switch of said caller returning a response message to the soft switch of said first callee level by level;

the soft switch of said first callee returning a response message to the application server of said first callee; and the application server of said first callee sending a final confirm response message containing a session description protocol of said caller to said second callee.

In addition, the above method also includes:

after the bidirectional session negotiation between said caller and said first callee, the application server of said first callee transferring a picked-up message of said first callee to the soft switch of said caller through the soft switch of said first callee level by level;

the soft switch of said caller sending a picked-up message to the application server of said caller; and the application server of said caller sending a end message to the media resource server at said caller side so as to stop playing the ring back tone for said caller.

The present invention provides a method for establishing a session between a caller and a callee, applying to a next generation network, after said callee picking up, further comprising:

restarting a session negotiation with said callee via a first application server corresponding to the callee, upon obtaining a session description protocol of said callee, sending an update request message containing said session description protocol of said callee to a second application server corresponding to the caller via all levels soft switch;

renegotiating, by the second application server, session with a caller according to said session description protocol of said callee;

after the caller completing session update, returning a response message containing a session description protocol of said caller to said callee, thus a bidirectional session negotiation is completed between said caller and callee.

According to the above method of the present invention, when performing the session renegotiation with said callee, the application server of said callee sends a re-request message without a session description protocol to said callee.

After the application server of said callee performs the session renegotiation with said callee, said callee returns its own session description protocol to its application server by the response message.

According to the above method of the present invention, after the session update, said caller returning a response message containing a session description protocol of said caller to said callee specifically including the steps of:

said caller returning a response message containing its own SDP to the application server of said caller;

the application server of said caller returning a response message to the soft switch of said caller;

the soft switch of said caller returning a response message to the soft switch of said callee level by level;

the soft switch of said callee returning a response message to the application server of said callee; and the application server of said callee sending a final confirm response message containing a session description protocol of said caller to said callee.

According to the above method of the present invention, it further includes:

after the bi-directional session negotiation between said caller and said callee, the application server of said callee transferring a picked-up message of said callee to the soft switch of said caller through the soft switch of said callee level by level;

the soft switch of said caller transferring a picked-up message to the application server of said caller; and the application server of said caller sending a end message to the media resource server at said caller side so as to stop playing the ring back tone for said caller.

The present invention has one or more than one of the following advantages:

(1) The present invention optimizes the SIP signaling flow in the case of forwarding or nesting services time by time, and provides a trigger method for forwarding different flows of multi-services or for forwarding and nesting different flows of one service, which can realize the combination and integration of services.

(2) In the signaling flow according to the method of the present invention, after the first callee being picked up, the server of the first callee will perform the session negotiation with a second callee to obtain the SDP of the second callee and then the server of the caller will perform the session negotiation with a caller to update the SDP of the callee at the caller side. Thus, the bidirectional session negotiation between the caller and the second callee is guaranteed so as to ensure that the caller and callees can be connected properly.

(3) It is not necessary to send the re-invite signaling for many times according to the method of the present invention, and thus the problem of single pass status due to the chaos of signaling control is solved.

DETAILED DESCRIPTION OF THE INVENTION

The method of the present invention will be explained in detail with reference to the drawings.

Figure 1:
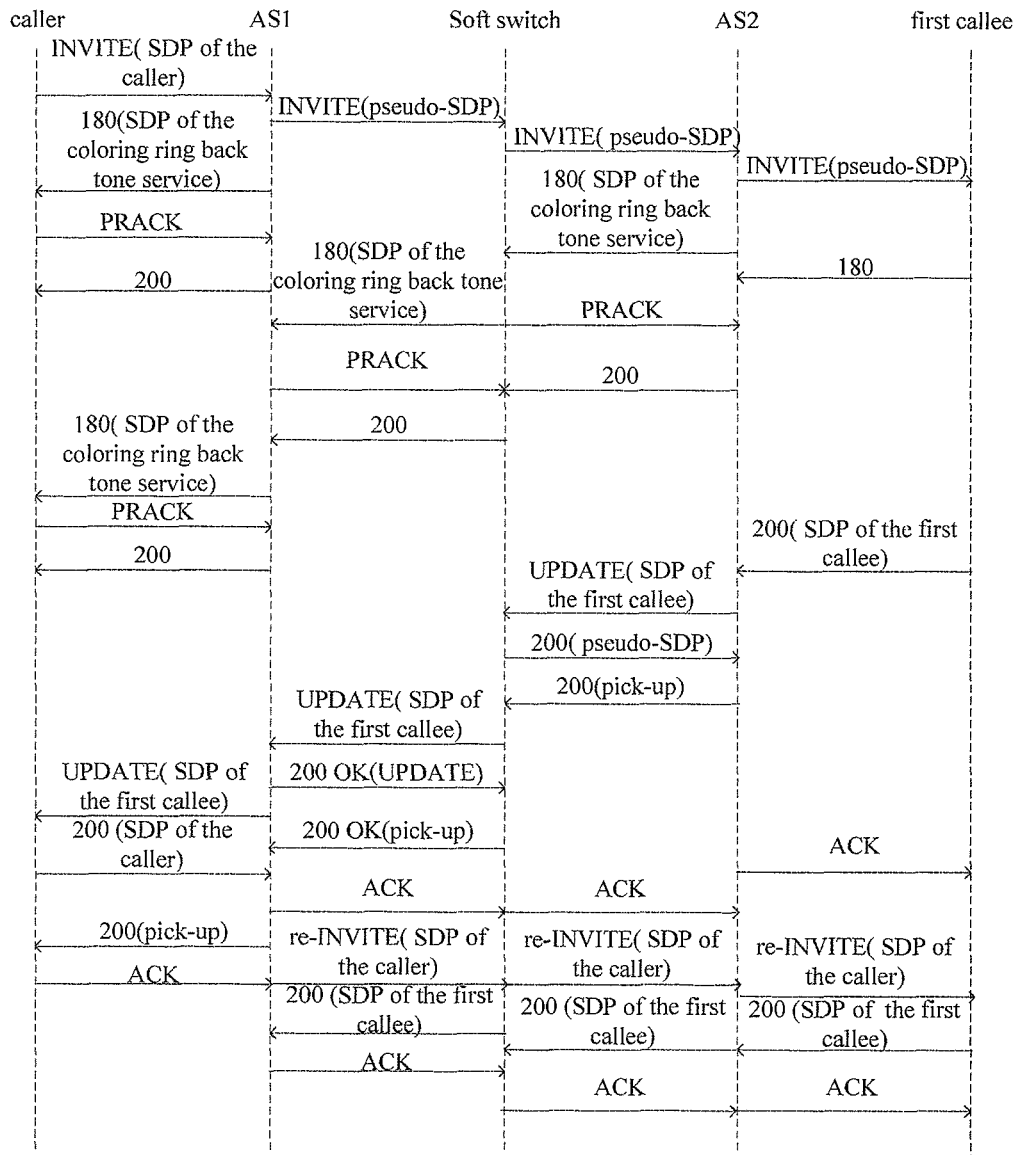
FIG. 1 is the diagram showing the call flow processing in the related art.
Figure 2:
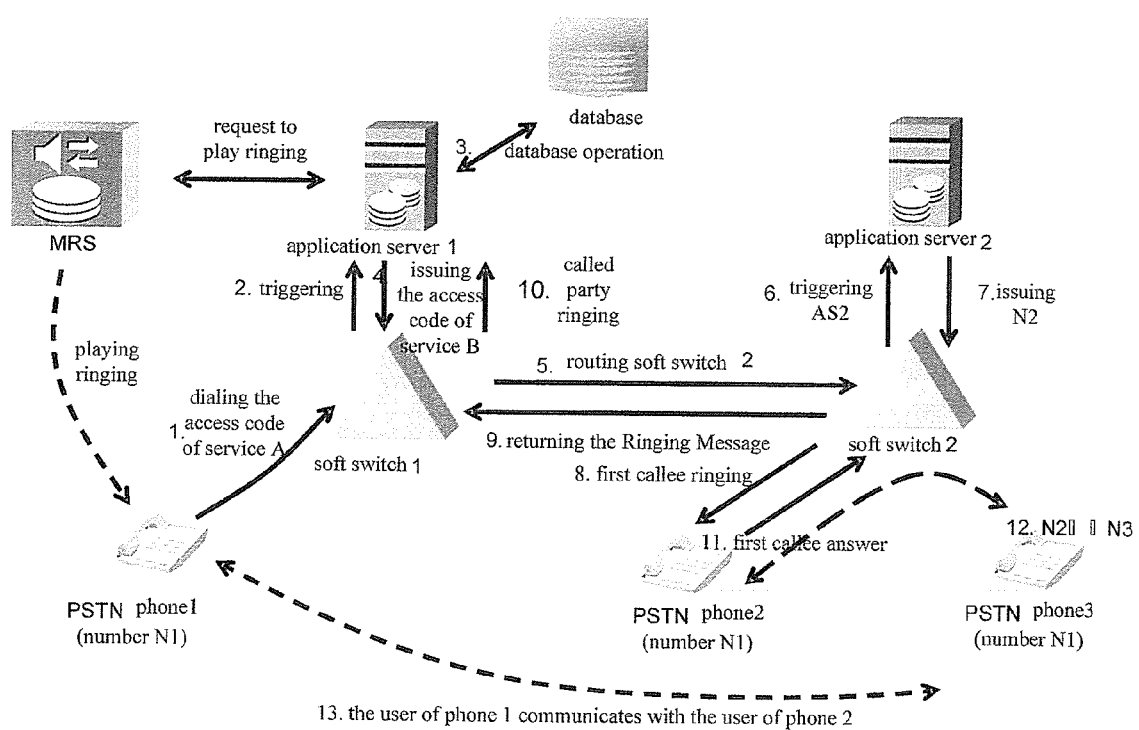
FIG. 2 is the schematic diagram showing the network entities related in the establishment of the communication between the caller and the callee.

FIG. 2 is the schematic diagram showing the network entities related in the establishment of the communication between the caller and the callee.

Wherein the network elements are:

the application server, which is used to perform the service logic and the call control of the soft switch;

the media resource server (MRS), which is used to provide the voice interaction with a user, to realize the voice playing and interaction in the language management flow and outgoing call flow etc. and to accomplish the playing function of the coloring ring back tone service and the voice service;

the soft switch, which is used to accomplish the service triggering, to receive the instruction from the application server so as to perform the call connection, to report events and to perform route transit;

the database, which is used to store the service related data; and different kinds of user terminals.

A typical example of forwarding the call once and triggering the application server twice is taken to illustrate the flows in the method for establishing the communication between the caller and the second callee according to the present invention and the flow includes:

1. The caller dials the access code of service A with phone 1 (phone number N1) and the call is reported to the soft switch 1.

2. The soft switch determines whether the access code belongs to service A, if so, triggers the corresponding application server AS1.

3. The application server AS1 performs the service A flow, including: interacting with a MRS, collecting the card number and authenticating the password of the caller; operating together with a database to perform the data comparison etc.

4. The application server AS1 issues a routing number of a next service to the soft switch 1, for example the routing number is the access code of service B.

5. The soft switch 1 routes the call to the related soft switch 2 according to the access code of service B.

6. The soft switch 2 determines whether the access code is the access code of service B, if so, triggers the corresponding application server AS2.

7. The application server AS2 performs the flow of service B and issues the routing number N2 to the soft switch 2; the soft switch 2 judges that the routing number N2 is a terminal number and initiates a call to that terminal (phone 2).

8. The phone 2 corresponding to N2 rings and the Ring Message is returned to the soft switch 2.

9. The soft switch 2 returns the Ring Message of the phone 2 to the soft switch 1.

10. The soft switch 1 returns the Ring Message of the phone 2 to the application server AS1 and the application server AS1 indicates the MRS to play the ring back tone for the caller;

11. After the user of the phone 2 picks up the phone, the call is transferred to the phone 3 with a number of N3; or the N2 is set to forward the call to the number N3.

12. The user of the phone 3 picks up the phone and the application server AS2 initiates a request to the phone 3 to negotiate on the reacquisition of the SDP of the second callee, wherein the second callee is the phone 3.

13. The phone 3 responds to the request and sends the Response Message containing its own SDP to accomplish the bi-directional session negotiation with a caller.

14. The phone 1 user communicates with a phone 3 user.

Figure 3:
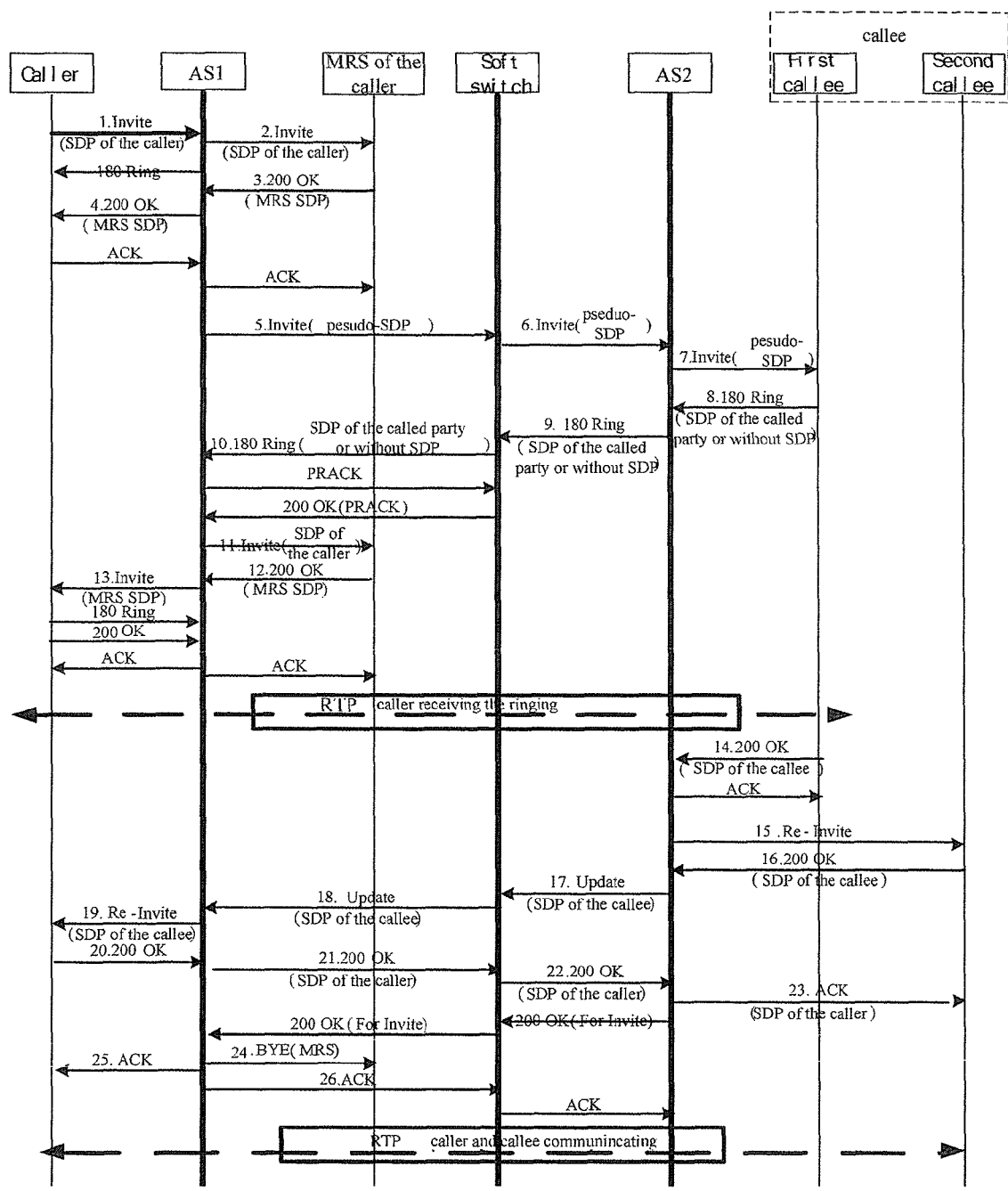
FIG. 3 is the flow chart showing the method for realizing the establishment of the communication between the caller and the callee according to an embodiment of the present invention.

The SIP signaling realization procedure in the above flows is shown in FIG. 3, which specifically includes:

1. The caller dials the access code of service A and uses the Invite signaling containing its own SDP to request for triggering the service A flow, and the request is sent to the application server AS1 of the caller for controlling the service A flow.

2. The application server AS1 performs the corresponding service logic, sends the Invite Message containing a SDP of the caller to the MRS of the caller and requests to collect the card number and the password of the caller.

3. The MRS returns the 200 OK Response Message containing its own SDP to the application server AS1.

4. The application server AS1 transfers the 200 OK Response Message containing a SDP of the MRS to the caller and prepares to play the corresponding warning tone and to collect the card number and the password of the caller.

5. After performing the authentication for the service initiated by the caller, the application server AS1 interacts with a database and issues the routing number of a next service to the soft switch 1 according to the service initiated by the caller, for example, the routing number is the access code of the next intelligent service B.

6. The soft switch 1 acquires the soft switch 2 corresponding to the service according to the fact that the issued routing number is the access code of the service B (for simplification, the soft switch 1 and the soft switch 2 are combined as the soft switch in FIG. 3.), and sends the Invite Message containing a SDP of the caller through the soft switch 2 to report to and then trigger the application server AS2 and then the procedure proceeds to the processing flow of the intelligent service B of the first callee.

7. The application server AS2 performs the internal service flow processing and sends the Invite Request Message to the End Office.

8. After connecting to the first callee, the End Office returns the Ring Message 180 containing a SDP of the first callee; the Ring Message may also not include the SDP of the first callee, if not, the SDP of the first callee will be included in the later picked-up Answering Message.

9. The application server AS2 returns the Ring Message 180 to the soft switch 2, which will return it to the soft switch 1.

10. The soft switch 1 transfers the Ring Message 180 to the application server AS1, then AS1 sends the PRACK (the reliable transmission response message in SIP protocol) Message to the soft switch 1, and the soft switch 1 returns the 200 OK Answering Message of the PRACK Message.

11. The application server AS1 sends the Invite Request Message containing a SDP of the caller to the MRS of the caller and requests to play the back tone for the caller.

12. The MRS of the caller returns the 200 OK Confirmation Response Message containing its own SDP to the application server AS1.

13. The application server AS1 sends the Invite Message containing a SDP of the MRS at the caller side to the caller, performs the session negotiation with a caller and plays the ring back tone to the caller.

14. The first call is picked up and returns the 200 OK Message containing a SDP of the first callee to the application server AS2.

15. After receiving the Picked-up Message of the first callee, the application server AS2 sends the re-Invite Message without its own SDP to the second callee for session renegotiation with the second callee; at this time, the call is forwarded to another terminal by the picked-up first callee, the real callee (i.e. the second callee) is the one after forwarding, so the SDP of the second callee can be obtained through the process of renegotiation.

16. The second callee returns the 200 OK Response Message containing its own SDP.

17. The application server AS2 sends the Update Message to the soft switch 2, which then returns the Update Message containing a SDP of the second callee to the soft switch 1.

18. The soft switch returns the Update Message containing a SDP of the second callee to the application server AS1.

19. The application server AS1 sends the re-Invite Message containing a SDP of the second callee to the caller and performs the session negotiation with the caller so as to update the SDP of the callee at the caller side.

20. The caller updates the SDP of the callee, changes the SDP of the original connected MRS of the caller to the SDP of the second callee, and after the success of the update, returns the 200 OK Response Message containing its own SDP to the application server AS1.

21. The application server AS1 returns the 200 OK Response Message containing a SDP of the caller to the soft switch 1, which then sends the Message to the soft switch 2.

22. The soft switch 2 returns the 200 OK Response Message containing a SDP of the caller to the application server AS2.

23. The application server AS2 sends the final ACK Message containing a SDP of the caller to the second callee and till then, a complete session renegotiation between the second callee and the caller is finished.

24. The application server AS2 returns the 200 OK Response Message for the picked-up first callee to the soft switch 2, then the soft switch 2 sends the Message to the soft switch 1, the soft switch 1 transfers it to the application server AS1, and after receiving the Picked-up Message of the first callee, the application server AS1 sends Bye Message (ending playing the ring) to the MRS of the caller to stop playing the ring back tone to the caller.

25. The application server AS1 returns the final ACK Message to the caller.

26. The application server AS2 returns the final ACK Message through the soft switches 1 and 2 to the application server AS2 and the communication between the caller and the second callee is established.

It can be seen from the above procedure that in the multi-service nesting flow established by the call of the caller, after the first callee is picked up, the application server AS2 of the first callee sends the re-invite Message without its SDP to a second callee and performs session renegotiation with the second callee, then the second callee returns the 200 OK Response Message containing its own SDP to the application server AS2 of the first callee, and the application server AS2 of the first callee sends the Update Message containing a SDP of the second callee to the application server AS1 of the caller so as to realize the update of the SDP of the callee at the caller side and accordingly guarantee the communication is established between the caller and the second callee.

The above is the illustration of the present invention with a typical example of forwarding the call once and triggering the application server twice. The present invention can also be applied to the case in which only the forwarding exists.

Figure 4:
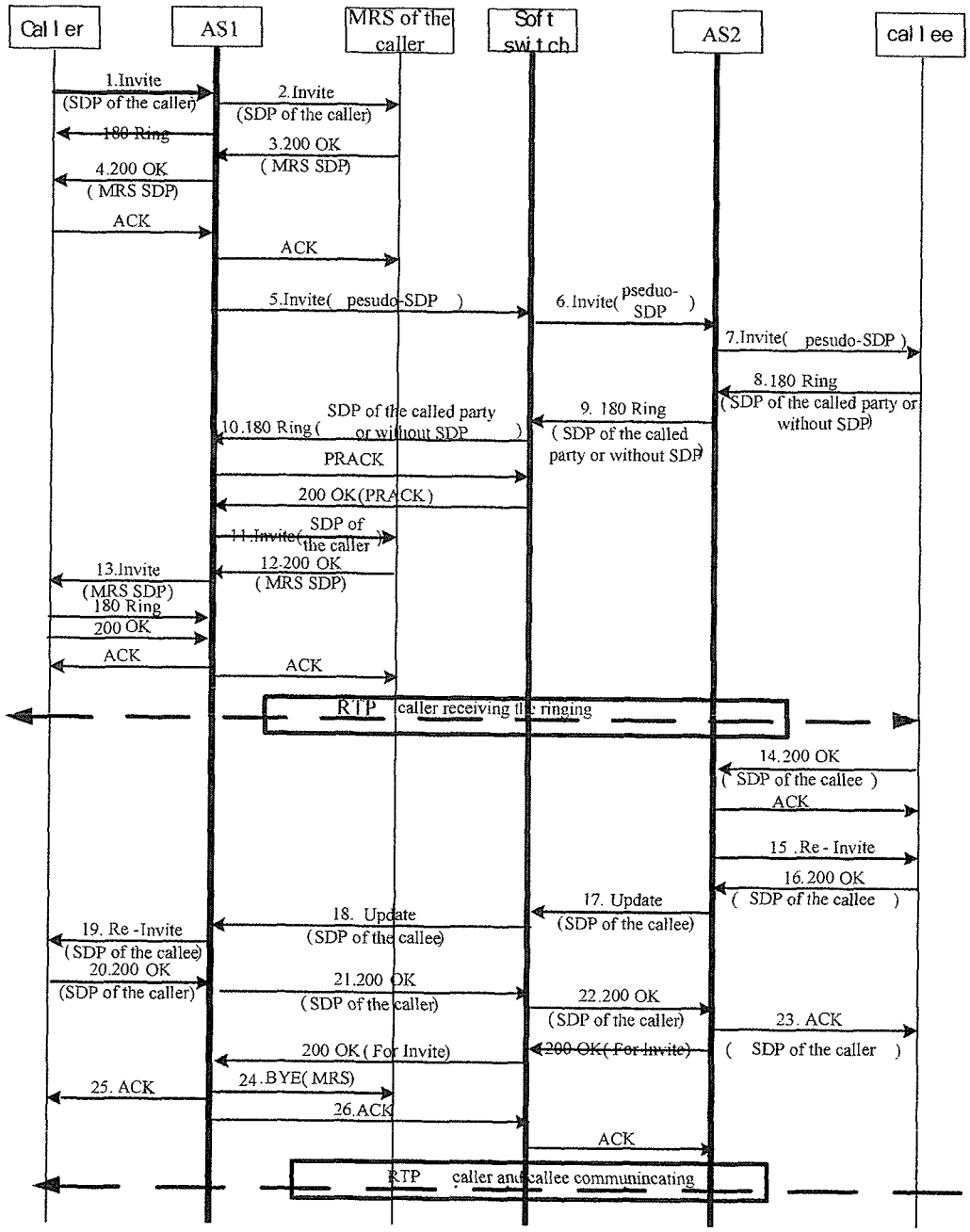
FIG. 4 is the flow chart showing another method for realizing the establishment of the communication between the caller and the callee according to an embodiment of the present invention.

In addition, when there is only the multi-service nesting but without forwarding, as shown in FIG. 4, the method in the present invention for realizing the communication between the caller and the callee includes the following flows:

1. The caller dials the access code of service A and uses the Invite signaling containing its own SDP to request for triggering the service A flow and the request is sent to the application server AS1 of the caller for controlling the service A flow.

2. The application server AS1 performs the corresponding service logic to send the Invite Message containing a SDP of the caller to the MRS of the caller and to request to collect the card number and the password of the caller.

3. The MRS returns the 200 OK Response Message containing its own SDP to the application server AS1.

4. The application server AS1 transfers the 200 OK Response Message containing a SDP of the MRS to the caller and prepares to play the corresponding warning tone and to collect the card number and the password.

5. After performing the authentication for the service initiated by the caller, the application server AS1 interacts with a database and issues the routing number of a next service to the soft switch 1 according to the service initiated by the caller, for example, the routing number is the access code of the next intelligent service B.

6. The soft switch 1 acquires the soft switch 2 corresponding to the service according to the fact that the issued routing number is the access code of the service B, and sends the Invite Message through the soft switch 2 to trigger the application server AS2 and then the procedure proceeds to the processing flow of the intelligent service B of the callee.

7. The application server AS2 performs the internal service flow processing and sends the Invite Request Message to the End Office.

8. After connecting to the callee, the End Office returns the Ring Message 180 containing a SDP of the callee. Alternatively, the Ring Message may also have the structure without the SDP of the callee, if without, the SDP of the callee will be included in the later Picked-up Answering Message.

9. The application server AS2 returns the Ring Message 180 to the soft switch 2, which then returns it to the soft switch 1.

10. The soft switch 1 transfers the Ring Message 180 to the application server AS1, then AS1 sends the PRACK (the reliable transmission response message in SIP protocol) Message to the soft switch 1, and the soft switch 1 returns the 200 OK Answering Message of the PRACK Message.

11. The application server AS1 sends the Invite Request Message containing a SDP of the caller to the MRS of the caller and requests to play the ring back tone for the caller.

12. The MRS of the caller returns the 200 OK Confirmation Response Message containing its own SDP to the application server AS1.

13. The application server AS1 sends the Invite Message containing a SDP of the MRS at the caller side to the caller, performs the session negotiation with a caller and plays the ring back tone for the caller.

14. The callee is picked up and returns the 200 OK Message containing a SDP of the callee to the application server AS2.

15. After receiving the Picked-up Message of the callee, the application server AS2 sends the re-Invite Message without its own SDP to the callee for the session renegotiation with the callee so as to obtain the latest SDP of the callee.

16. The callee returns the 200 OK Response Message containing its own SDP.

17. The application server AS2 sends the Update Message to the soft switch 2, which then returns the Update Message containing a latest SDP of the callee to the soft switch 1.

18. The soft switch 1 returns the Update Message containing a SDP of the callee to the application server AS1.

19. The application server AS1 sends the re-Invite Message containing a SDP of the callee to the caller and performs the session negotiation with a caller so as to update the SDP of the callee at the caller side.

20. The caller performs the update of the SDP of the callee, changes the SDP of the original connected MRS of the caller to the latest SDP of the callee, and after the success of the update, returns the 200 OK Response Message containing its own SDP to the application server AS1.

21. The application server AS1 returns the 200 OK Response Message containing a SDP of the caller to the soft switch 1, which then sends the Message to the soft switch 2.

22. The soft switch 2 returns the 200 OK Response Message containing a SDP of the caller to the application server AS2.

23. The application server AS2 sends the final ACK Message containing a SDP of the caller to the callee and till then, a complete session renegotiation between the callee and the caller is finished.

24. The application server AS2 returns the 200 OK Response Message for the picked-up callee to the soft switch 2, the soft switch 2 then sends the Message to the soft switch 1, the soft switch 1 transfers it to the application server AS1, and after receiving the Picked-up Message of the callee, the application server AS1 sends Bye Message (ending playing the ring) to the MRS of the caller to stop playing the ring back tone for the caller.

25. The application server AS1 returns the final ACK Message to the caller.

26. The application server AS2 returns the final ACK Message through the soft switches 1 and 2 to the application server AS2 and the communication between the caller and the callee is established accordingly.

It can be seen from the above procedure that in the multi-service nesting flow established by the call of the caller, after the callee is picked up, the application server AS2 of the callee sends the re-Invite Message without its own SDP to the callee for the session renegotiation with the callee, then the callee returns the 200 OK Response Message containing its own SDP to the application server AS2 of the callee server, and the application server AS2 of the callee server sends the Update Message containing a SDP of the callee to the application server AS1 of the caller so as to realize the update of the SDP of the callee at the caller side and accordingly guarantee the communication is established between the caller and the callee.

The above embodiments illustrate the multi-service triggering in detail with an example of triggering two service flows (relating two soft switches and two application servers). The realization principle for nesting triggering more than two services or flows is the same with that for triggering two services or flows, and the only difference is that it may relate to more soft switches and application servers to transmit the above signalings level by level.

Obviously, those skilled in the art may make improvements and modifications to the present invention without departing from the spirit and range of the present invention. It is intended that the present invention covers the modifications and variations of this invention provided they come within the scope of the appended claims and their equivalents.

The invention claimed is:

1. A method for establishing a session between a caller and a second callee, comprising:
receiving, by a callee Application Server (AS), a caller's call request from a caller AS and connecting to a first callee;
requesting, by the first callee, to forward the call request to the second callee after the caller receives a ring back tone;
sending, by the callee AS, a re-invite message to the second callee for a session negotiation after the first callee requests to forward the call request to the second callee;
receiving, by the callee AS, a response message including a session description protocol (SDP) of the second callee from the second callee;
sending, by the callee AS, an update request message including the SDP of the second callee to the caller AS through one or more soft switches so that the caller AS performs a session negotiation with the caller according to the SDP of the second callee;
receiving, by the caller AS, a response message including an SDP of the caller from the caller;
sending, by the caller AS, the response message to the callee AS through the one or more soft switches;
receiving, by the callee AS, the response message from the caller AS;
performing, by the callee AS, a session negotiation with the second callee according to the SDP of the caller; and
sending, by the caller AS, an end message to a media resource server so as to stop playing the ring back tone for the caller after receiving the update request message including the SDP of the second callee.

* * * * *